Dec. 26, 1967
F. H. MUELLER
3,359,999
PACKING CHAMBERS FOR O-RINGS
Filed April 13, 1965
2 Sheets-Sheet 1
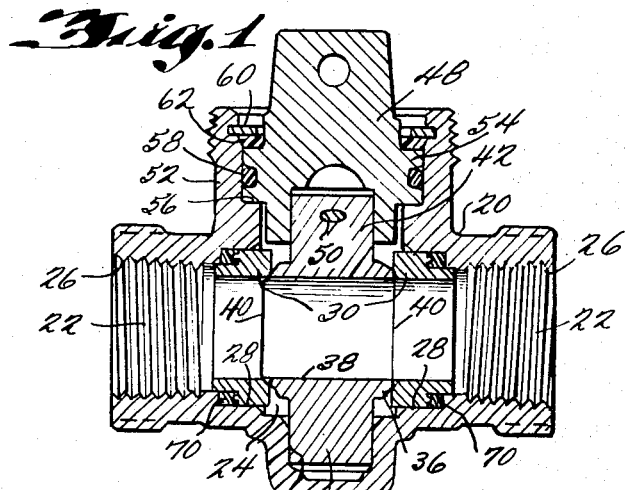
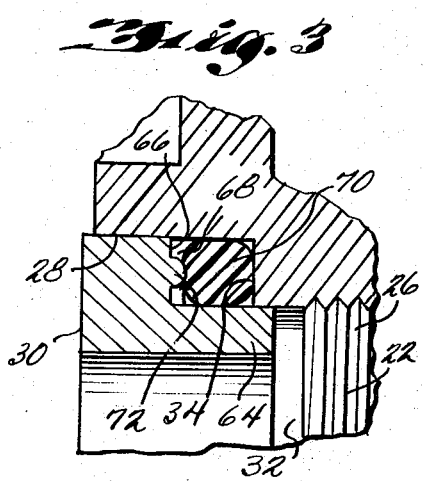
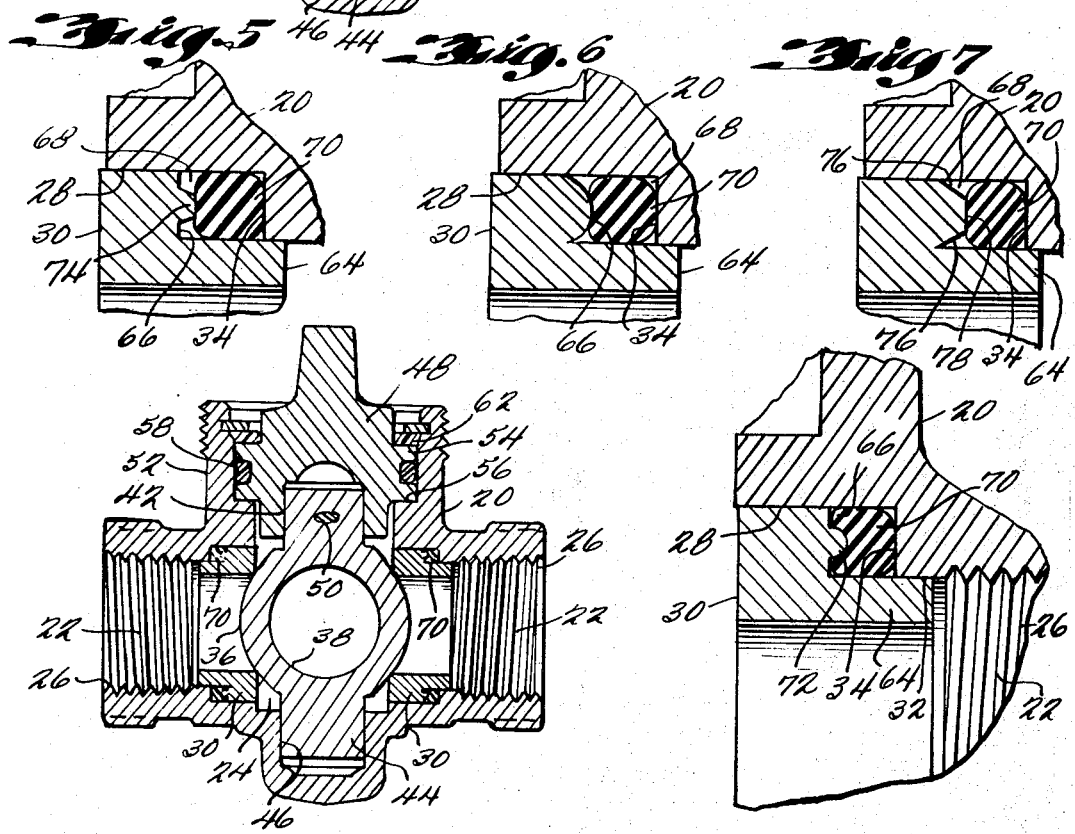
INVENTOR
FRANK H. MUELLER
By Cushman, Darby & Cushman
ATTORNEYS

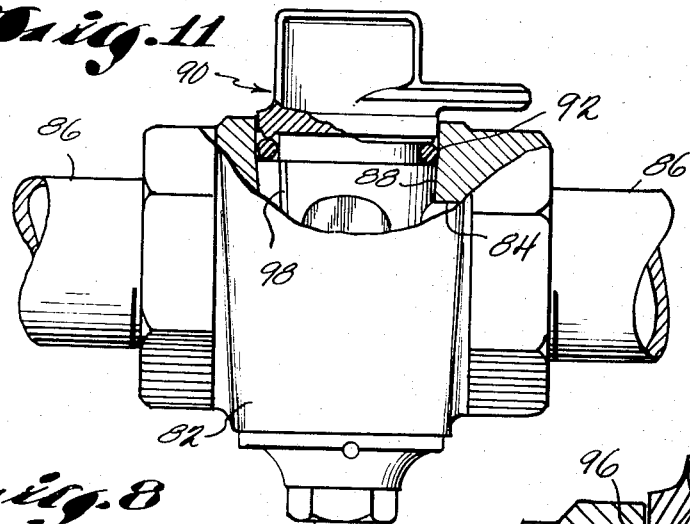
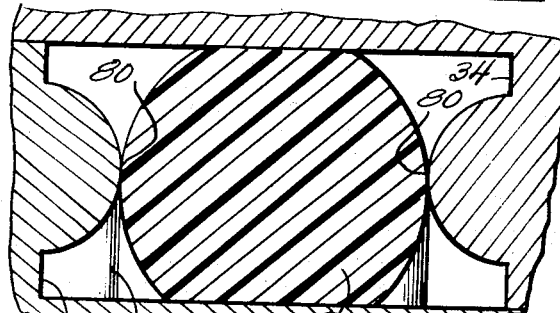
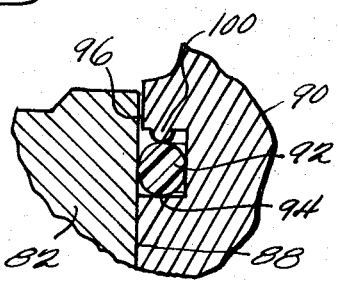
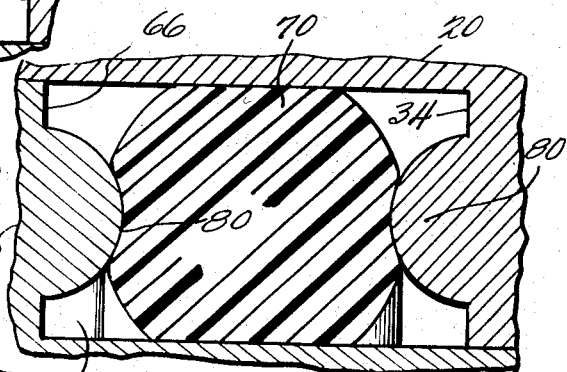
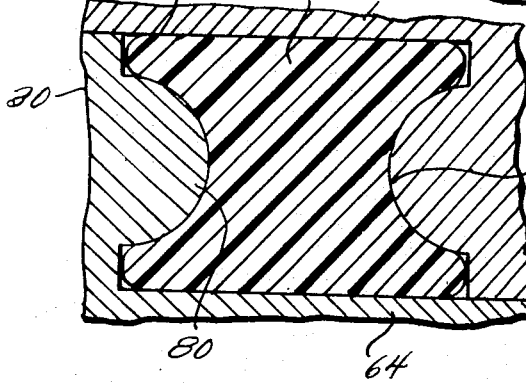

United States Patent Office 3,359,999
Patented Dec. 26, 1967

3,359,999
PACKING CHAMBERS FOR O-RINGS
Frank H. Mueller, Decatur, Ill., assignor to Mueller Co., Decatur, Ill., a corporation of Illinois
Filed Apr. 13, 1965, Ser. No. 447,811
9 Claims. (Cl. 137—246.15)

ABSTRACT OF THE DISCLOSURE

An annular packing chamber formed by a pair of opposed radially facing surfaces and a pair of opposed axially facing surfaces confining an O-ring which is circular in cross-section when unconfined for effecting a seal between relatively movable members. At least one of the opposed axially facing surfaces is at least partly convex so as to provide a greater space or cross-sectional area for the O-ring to deform into than would be provided if such axially facing surface were flat, so as to increase the "spring effect" of the O-ring.

---

This invention relates to improvements in arrangements for effecting a seal between two relatively movable members by use of O-rings and, more particularly, to arrangements for increasing the "spring effect" of O-rings when used to resiliently resist relative movement between the two members. The improvement also will serve to increase the "spring effect" of an O-ring when deformed by fluid pressure on one side thereof, as contrasted to deformation by a mechanically-applied force.

O-rings, which normally are circular in radial section when unconfined, conventionally are disposed in annular or endless packing chambers that generally are four sided in radial section. Two sides of such chambers usually are provided by a pair of opposed parallel cylindrical surfaces, one facing radially inwardly and the other radially outwardly, between which the O-ring is initially slightly compressed, so that instead of being circular in radial section it normally is of a somewhat elliptical configuration. The other two sides of the chamber usually are provided by a pair of opposed axially-facing generally-flat annular surfaces disposed generally normal to the axis of the chamber, although it is known to employ axially-facing surfaces that may be somewhat concave in radial section. Chambers having the foregoing configurations do not provide the results achieved by this invention.

Accordingly, it is an object of this invention to provide an O-ring packing chamber with a side wall configuration that will increase the "spring effect" of the O-ring when it is forced against one of the axially-facing surfaces of the chamber by the application of either mechanical or fluid pressure force.

It is another object of this invention to provide an O-ring packing chamber construction, wherein an O-ring therein is adapted not only to provide a seal but also to yieldingly resist relative movement between two members, which provides for an increase in the possible amount of relative movement between the two members, as contrasted to a construction wherein the two opposed axially-facing walls of the packing chamber are either flat or concave in radial section.

Other objects and advantages of the invention will become apparent from the following description and accompanying drawings in which:

FIGURE 1 is a vertical sectional view of a ball valve having this invention applied thereto, the valve being shown in its open position;

FIGURE 2 is a view corresponding to FIGURE 1 but showing the valve in its closed position;

FIGURE 3 is an enlarged fragmentary view of a portion of FIGURE 1;

FIGURE 4 is a view corresponding to FIGURE 3 but showing a portion of FIGURE 2;

FIGURES 5, 6 and 7 are views corresponding to FIGURE 3 but illustrating somewhat modified forms of the invention;

FIGURES 8, 9 and 10 are views corresponding to FIGURE 3, on a somewhat larger scale, illustrating a further modification of the invention and also successive stages of mechanical compression of an O-ring in a packing chamber in accordance with this invention;

FIGURE 11 is a side elevational view, partly broken away and partly in section, of a rotary plug valve having this invention applied thereto; and FIGURE 12 is an enlarged fragmentary sectional view of a portion of FIGURE 11.

Referring now to FIGURES 1 to 4 of the drawings, there is shown a ball valve of the type disclosed in detail in the copending application of Frank H. Mueller et al., Ser. No. 417,435, filed Dec. 10, 1964, so that no detailed description of the valve is necessary here. The valve includes a housing 20 provided with aligned flow passages 22 intersected by a valve chamber 24 having a closed lower end and an open upper end. The outer ends of the flow passages 22 may be provided with interior threads 26 for connecting the valve into a line, while the inner ends are counterbored to provide cylindrical recesses 28 within which are snugly and slidably mounted valve seat rings 30. The seat rings 30 may be formed of thermoplastic resin compositions, such as those essentially comprising nylon. For reasons later evident the flow passages 22 are provided with smooth-walled cylindrical sections 32 adjacent the inwardly-facing shoulders 34 at the bottom of the recesses 28, as shown best in FIGURES 3 and 4.

Interposed between the two seat rings 30 is a rotatable valve ball 36 having a transverse cylindrical flow passage 38 therethrough alignable with the seat rings 30 to open the valve. The outer surface of the valve ball 36 is essentially in the shape of a sphere provided with flats 40 (FIGURE 1) on diametrically opposite sides thereof where the surface of the sphere is intersected by the transverse passage 38 through the ball. The valve ball 36 is provided with upper and lower trunnions 42 and 44, respectively, the latter being journaled in a bearing 46 defined by the lower end of the valve chamber 24. The upper trunnion is snugly received in a socket in a cap 48 and secured therein by a transverse pin 50. The housing 20 is provided with an enlarged annular extension 52 surrounding the open end of the valve chamber 24 and the cap 48 is provided with a circumferential flange 54 journaled in the extension and seated against an outwardly-facing annular shoulder 56 at the inner end of the extension. The flange 54 is provided with a circumferential groove within which is received an O-ring 58 to effect a seal between the cap 48 and the extension 52. The cap 48, and consequently the valve ball 36, is retained in place by a split ring 60 received in a circumferential interior groove in the extension 52 and overlying the flange 54, with an antifriction washer 62 interposed therebetween.

The outer end of each valve seat ring 30 is exteriorly reduced to provide a cylindrical extension 64 snugly and slidably received in the cylindrical section 32 of the corresponding flow passage 22, as best shown in FIGURES 3 and 4. The extension 64 provides the ring 30 with a shoulder 66 opposed to the shoulder 34 at the bottom of the seat ring-receiving recess 28 in the housing 20. From this construction it will be seen that between each seat ring 30 and the housing 20 there is provided an annular packing chamber 68 defined by the radially-facing opposed cylindrical surfaces of the seat ring extension 64 and the seat ring-receiving recess 28, and the axially-facing opposed shoulders 34 and 66. Disposed in the chamber 68 is a resilient pressure-deformable packing ring 70, of rubber, Neoprene, or the like, commonly called in the art an O-ring. The ring 70, when unconfined, normally is circular in radial section, but of a radial section diameter slightly greater than the radial dimension of the packing chamber 68, i.e. the radial distance between the exterior cylindrical surface of the seat ring extension 64 and the cylindrical surface of the seat ring-receiving recess 28. Accordingly, the O-ring 70 is slightly compressed between these two opposed radially-facing surfaces and so assumes a somewhat elliptical configuration in radial section when initially installed in the chamber 68.

In a trunnion-supported ball valve of the type illustrated in FIGURES 1 and 2, it is desirable that each seat ring 30 be mechanically urged against the outer spherical surface of the valve ball 36 in order to effect a seal therewith. The O-rings 70 in the above-described construction perform this function by engaging between the shoulders 34 and 66 and acting as a spring, when compressed. The proportions are such that when the seat rings 30 are initially installed in the housing 20, and before the valve ball 36 is inserted therebetween, the distance between the seat rings is slightly less than the transverse dimension of the valve ball axially of the flow passage 38 therethrough, i.e. in a direction perpendicular to the aforementioned diametric flats 40 on the opposite sides of the valve ball. When the seat rings 30 are thus initially installed, the O-rings 70 are under no axial compression and merely make line contact with the opposed axially-facing sides 34 and 66 of the packing chamber 68. The valve ball 36 is assembled by pushing it, while in its open position, through the open end of the valve chamber 24 between the two seat rings 30. When the valve ball 36 is so inserted it will push each seat ring 30 slightly back into its housing recess 28 and thus initially somewhat compress the corresponding O-ring 70 in an axial direction. This compression, of course, slightly deform the O-rings 70 even more out of their unconfined circular configuration in radial section. Because of their resiliency, however, the O-rings 70 constantly tend to resume their original configuration, i.e. circular in radial section, and thus exert a force on the seat rings 30 to urge them against the valve ball 36.

When the valve ball 36 is turned from its open to its closed position shown in FIGURE 2, it will push the seat rings 30 back even further into their housing recesses 28, and thus further compress and deform the O-rings 70, thus increasing the forces exerted by the latter to urge the seat rings 30 against the outer surface of the valve ball 36.

The full extent of possible axial movement of each seat ring 30, from a position wherein the corresponding O-ring 70 is under no initial axial compression to a position wherein the O-ring is fully compressed and deformed, depends upon the configuration, in radial section, of the O-ring chamber 68, more especially the configuration of the axially-facing walls of such chamber. The limit of inward movement of each seat ring 30 is obtained when volume of the corresponding O-ring chamber 68 is diminished to such an extent that it equals the corresponding volume of the O-ring 70. When this occurs, the O-ring 70 is deformed to such an extent that it completely fills and conforms to the shape of the O-ring chamber 68.

The corresponding O-ring chambers disclosed in the aforementioned copending application are generally rectangular in radial section, i.e. the axially-facing walls of the chambers are flat. In such construction, when the volume of the O-ring chamber is diminished to equal that of the O-ring therein, the latter is deformed into a rectangular configuration in radial section, and the extent of permissible movement of the seat ring is the difference between the axial thickness of the ring when so fully deformed, and the axial thickness of the ring when initially installed in its chamber and under no axial compression.

By means of this invention, the extent of axial movement of each seat ring can be increased over that obtainable in a construction wherein the O-ring chamber is rectangular in radial section. Thus, the spring effect exerted by each O-ring 70 on its corresponding seat ring 30 can be increased because the O-ring will exert a deformation-resisting spring-like force on its seat ring over a great extent of axial movement of the latter.

The improved results of this invention are obtained by providing at least one of the axially-facing walls of the O-ring chamber 68 with a convex configuration which initially makes substantially line contact with the O-ring 70 at a location thereon corresponding to its major axial dimension, i.e. substantially midway between the opposed radially-facing walls of the O-ring chamber 68. This construction provides increased space for the O-ring 70 to be deformed into as the seat ring 30 is urged against the O-ring.

For this purpose in the embodiment of FIGURES 1 to 4, the shoulder 66 on the seat ring 30 is provided with an annular rib 72 located substantially midway between the inner and outer edges of the shoulder. This rib 72 has a rounded edge which initially makes only line contact with the O-ring 70. As the seat ring 30 is forced into its recess 28, the O-ring 70 will be deformed, but from an inspection of FIGURE 4 it will be seen that when the O-ring is completely deformed so as to completely fill the packing chamber 68, there is provided a greater cross sectional area of the chamber for the O-ring to deform into than if the chamber had been defined, in part, by a flat annular shoulder on the ring 30 located in the plane of the apex of the edge of the rib 72. In other words, the ratio of the distance between the rib 72 and the shoulder 34, when the O-ring 70 is initially contacted by the rib as shown in FIGURE 3, and the corresponding distance when the O-ring is fully deformed as shown in FIGURE 4, is greater than the ratio would have been had the seat ring 30 been provided only with a flat annular shoulder to axially compress the O-ring. Looking at the situation in another manner, it will be seen that the distance between the apex of the edge of the rib 72 and the shoulder 34 when the O-ring 70 is fully compressed and deformed, as shown in FIGURE 4, is less than it could have been had the seat ring 30 been provided with a flat O-ring-engaging annular shoulder in the plane of the apex of the rib 72. Thus, the "spring effect" exerted by the O-ring 70 on the seat ring 30 is greatly increased by the configuration of the gasket chamber 68 shown in FIGURES 3 and 4.

Modifications achieving comparable results obviously are possible. For example, as shown in FIGURE 5, the shoulder 66 is provided with a rib 74 having a flat edge and inclined sides. This configuration will achieve results comparable to the configuration shown in FIGURES 3 and 4.

In the embodiment shown in FIGURE 6, the entire shoulder 66 on the seat ring 30 is of a convexly curved configuration in radial section, i.e. substantially semicircular. This configuration will not achieve quite as great a "spring effect" as the "rib" configuration shown in FIGURES 3, 4 and 5 because less space is provided, on initial contact between the seat ring shoulder 66 and the O-ring 70, for the latter to be deformed into.

In the embodiment disclosed in FIGURE 7, the shoulder on the seat ring 30 is provided with inclined edge portions 76 which converge toward a flat central portion 78. This construction is similar to that disclosed in FIGURE 6, and provides results comparable to the latter.

Referring now to FIGURES 8 to 10, there is shown a further modification wherein both of the opposed axially facing surfaces 34 and 66 of the O-ring chamber 68 are provided with annular ribs 80, similar to the rib 72 shown in FIGURES 3 and 4, that are disposed generally midway between the edges of such surfaces 34 and 66. These ribs 80 are convexly curved in radial section, i.e. the shoulders 34 and 66 are each provided with a convexity. The employment of opposed convexities, as contrasted to a single convexity, increases the "spring effect" of the O-ring 70 to an even greater extent. This can be seen from a comparison of FIGURE 8, wherein the O-ring 70 makes only initial line contact with the ribs 80, with FIGURE 10 wherein the seat ring 30 has been moved axially a distance sufficient to deform the O-ring 70 so that it almost completely fills and conforms to the O-ring chamber 68. It will be seen that the ratio of the minimum distances between the two ribs 80 shown in FIGURE 8 and shown in FIGURE 10, is increased even further from the corresponding ratios shown in FIGURES 3 and 4.

Referring now to FIGURES 11 and 12, there is shown an application of this invention to maintain lubricant pressure in a closed lubricant system in a rotary plug valve of the type shown, for example, in the patent to Mueller No. 2,653,791, granted Sept. 29, 1953. The valve shown in FIGURE 11 is provided with a housing 82 having aligned flow passages 84 to which conduits 86 are connected. The flow passages 84 are intersected by a tapered plug seat 88 in which is rotatably mounted a tapered valve plug 90. The construction is that known in the trade as a ground key stop, i.e. wherein the valve plug 90, known as a key, is lapped or ground to its seat 88 in the manufacturing process.

At each end of the lapped surface of the plug 90 there is provided an O-ring seal in the form of an O-ring 92 disposed in a groove 94 in one of the opposed surfaces of the plug and its seat 88, only one of such grooves being illustrated here. As shown in FIGURE 11, the groove 94 is formed in the plug 90, and the latter is reduced or relieved, as at 96, outwardly beyond the groove, as disclosed in detail in the aforementioned Mueller patent and as shown in FIGURE 12 herein, for reasons detailed in such patent. Between the O-ring grooves 94 the valve plug 90 is provided with longitudinal lubricant grooves or channels 98 which define, with the grooves 94 and the O-rings 92, a closed lubricant system into which lubricant can be introduced under pressure in an appropriate manner, such as that disclosed, for example, in the aforesaid patent.

The O-ring 92, when unconfined, normally is circular in radial section, but when installed in the groove 94 is slightly compressed between the bottom thereof and the opposed surface of the seat 88 so as to assume a slightly elliptical configuration, as shown in FIGURE 12. It will be seen that the introduction of the lubricant into the closed system, as aforesaid, exerts lubricant pressure on the inner side of the O-ring 92 and forces the latter against the outer side wall of its groove 94. If the pressure is sufficient, the O-ring 92 will be deformed out of its initial slightly elliptical configuration until it conforms to the configuration of the outer side wall of its groove 94. Since the O-ring 92 tends to assume its original shape, it maintains pressure on lubricant in the system.

The outer side wall of the O-ring groove 94 is provided with a convex configuration similar to that shown in FIGURES 3 and 4, i.e. with an annular rib 100 having a curved edge disposed substantially midway between the radially-facing opposed surfaces of the O-ring chamber, i.e. midway between the bottom of the groove 94 and the opposed surface of the plug seat 88. It will be seen that this convex configuration permits the O-ring 92 to be deformed and to move the center of its mass axially to a greater extent than if the outer side wall of the groove 94 were a plain flat annular surface. Thus, the provision of a convexity on the outer side wall of the groove 94 increases the "spring effect" of the O-ring 92 and permits the maintenance of pressure on lubricant in the system to a greater extent than could have been otherwise achieved. In other words, the lubricant system is provided with a greater capacity for storage of lubricant under pressure by means of this invention.

It thus will be seen that the objects of the invention have been fully and effectively accomplished. It will be realized, however, that the specific embodiments illustrated and described herein have been chosen for the purpose of demonstrating and disclosing the principles of this invention, and are subject to modification without departure from such principles.

For example, although the O-ring chambers disclosed herein are annular, the principles of the invention are equally applicable to such endless chambers that are not truly circular, e.g. rectangular, elliptical, etc. Accordingly, the term "annular" as used in the claims includes endless chambers and packing rings of other than circular shape. Similarly, the term "radial section" includes planes perpendicular to the major extent of endless chambers and packing rings. Accordingly, the invention includes all modifications and embodiments encompassed within the spirit and scope of the following claims.

What is claimed is:

1. In an arrangement for effecting a seal between two relatively movable members including an annular packing chamber between the members, generally four-sided in radial section and defined by a pair of opposed generally radially-facing surfaces, one on each of the members, and a pair of opposed generally axially-facing surfaces, and a resilient pressure-deformable packing O-ring in the chamber, the O-ring being generally circular in radial section when unconfined, slightly compressed between the radially-facing surfaces, and subject to being forced against one of the axially-facing surfaces by mechanical or fluid pressure force, the improvement that the one axially-facing surface is at least partly convex in radial section and initially is engaged with the O-ring along substantially a line of contact located generally at the major axial dimension of the O-ring and generally midway between the radially-facing surfaces, whereby the O-ring can be deformed to a greater extent against the one axially-facing surface than if the latter were flat in the plane of the apex of the convex portion of said one axially-facing surface and whereby an increase is obtained in the ratio between the axial thickness of the O-ring when unconfined and the axial thickness of the O-ring, substantially midway between the radially-facing surfaces, when the O-ring is deformed against the one axially-facing surface to an extent to substantially conform thereto.

2. The arrangement defined in claim 1 wherein the one axiall-facing surface is generally semicircular, in radial portions and an axially-extending annular rib between said edge portion.

3. The structure defined in claim 2 wherein the annular rib has a curved apex.

4. The structure defined in claim 2 wherein the annular rib is provided with inclined sides which converge toward a flat apex.

5. The structure defined in claim 1 wherein the one axially-facing surface is generally semicircular, in radial section.

6. The structure defined in claim 1 wherein the one axially-facing surface is provided with inclined edge portions which converge to a flat central portion.

7. The structure defined in claim 1 in which at least one of the axially-facing surfaces is movable toward the other to compress the ring therebetween and wherein both of the axially-facing surfaces are at least partly convex in radial section and are initially engaged with the ring along substantially lines of contact located generally midway between the radially-facing surfaces.

8. The structure defined in claim 1 wherein one of the members is an axially movable ball valve seat ring and the other member is a ball valve casing means, one of the axially-facing surfaces being carried by each of the members, and wherein the packing ring serves as a spring to constantly urge the seat ring against a valve ball.

9. The structure defined in claim 1 wherein one of the members is the plug of a rotary plug valve and the other member is a seat means for the plug, the ring provides a seal between the valve plug and its seat means at one end of the latter, the annular packing chamber is defined by a groove in one of the opposed surfaces of the members, the one axially-facing surface forms the outer side wall of the groove, and wherein the valve is provided with a closed lubricant system which exerts lubricant pressure against the inner side of the packing ring.

References Cited
UNITED STATES PATENTS

| | | | |
|---|---|---|---|
| 2,653,791 | 9/1953 | Mueller | 137—246.15 |
| 2,839,074 | 6/1958 | Kaiser | 251—174 X |
| 2,916,254 | 12/1959 | Wendell | 151—172 |
| 3,215,441 | 11/1965 | Horvereid | 277—176 |

CLARENCE R. GORDON, *Primary Examiner.*